(12) United States Patent
Ruan et al.

(10) Patent No.: US 11,809,757 B2
(45) Date of Patent: Nov. 7, 2023

(54) NON-TRANSITORY COMPUTER-READABLE STORAGE MEDIUM

(71) Applicant: BROTHER KOGYO KABUSHIKI KAISHA, Nagoya (JP)

(72) Inventors: Longlong Ruan, Nagoya (JP); Machiko Watanabe, Nagoya (JP); Masanori Oda, Iwakura (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/676,051

(22) Filed: Feb. 18, 2022

(65) Prior Publication Data

US 2022/0171578 A1    Jun. 2, 2022

Related U.S. Application Data

(63) Continuation of application No. PCT/JP2020/029785, filed on Aug. 4, 2020.

(30) Foreign Application Priority Data

Aug. 21, 2019    (JP) ................................. 2019-150806

(51) Int. Cl.
*G06F 3/12* (2006.01)

(52) U.S. Cl.
CPC .......... *G06F 3/1204* (2013.01); *G06F 3/1256* (2013.01); *G06F 3/1257* (2013.01);
(Continued)

(58) Field of Classification Search
CPC .... G06F 3/1204; G06F 3/1256; G06F 3/1257; G06F 3/1268; G06F 3/1285; G06F 3/1296; B41J 2/17546; G06Q 10/00; G06Q 30/06
See application file for complete search history.

(56) References Cited

U.S. PATENT DOCUMENTS 11,397,398 B2 * 7/2022 Otsuka ............... G03G 15/5079
11,436,439 B2 * 9/2022 Shinzaki ................. G06F 18/41
(Continued)

FOREIGN PATENT DOCUMENTS

JP    2002-196911 A    7/2002
JP    2002-203285 A    7/2002
(Continued)

OTHER PUBLICATIONS

International Search Report for PCT/JP2020/029785 dated Oct. 20, 2020.
(Continued)

*Primary Examiner* — Helen Zong
(74) *Attorney, Agent, or Firm* — KENEALY VAIDYA LLP

(57) ABSTRACT

A non-transitory computer-readable storage medium storing a program executable by a computer of a device, the program, when executed by the computer, causing the device to perform: causing a reader of the device to read a code image; determining, based on code information indicated by the code image and identification information of a consumable item of a printer stored in a first memory, whether to register the identification information of the consumable item indicated by the code information; registering the identification information in a second memory in a case where the determining determines to register the identification information; and displaying, on a display of the device, unique information of a consumable item whose identification information is registered in the second memory in a display mode different from a display mode of unique information of a consumable item whose identification information is not registered in the second memory.

10 Claims, 12 Drawing Sheets

(52) U.S. Cl.
CPC .......... *G06F 3/1268* (2013.01); *G06F 3/1285* (2013.01); *G06F 3/1296* (2013.01)

(56) References Cited

U.S. PATENT DOCUMENTS

| | | | | |
|---|---|---|---|---|
| 2006/0120735 | A1* | 6/2006 | Adkins | G03G 21/02 |
| | | | | 399/27 |
| 2009/0033974 | A1* | 2/2009 | Nishimi | G06Q 10/087 |
| | | | | 358/1.14 |
| 2010/0235424 | A1* | 9/2010 | Mori | H04N 1/00204 |
| | | | | 715/764 |
| 2013/0121743 | A1 | 5/2013 | Ishii et al. | |
| 2015/0161909 | A1* | 6/2015 | Won | F25D 29/00 |
| | | | | 434/127 |
| 2017/0109110 | A1* | 4/2017 | Kitagata | G06F 3/1272 |
| 2018/0349835 | A1* | 12/2018 | Ishida | G06Q 10/087 |
| 2019/0102128 | A1* | 4/2019 | Banno | G06F 3/1287 |
| 2020/0336327 | A1* | 10/2020 | Shirasu | G06F 13/00 |
| 2021/0007459 | A1* | 1/2021 | Jeong | A45D 29/18 |
| 2021/0165613 | A1* | 6/2021 | Krishna Raj | G06F 3/1285 |
| 2022/0253259 | A1* | 8/2022 | Yamamoto | G06F 3/1203 |

FOREIGN PATENT DOCUMENTS

| | | | |
|---|---|---|---|
| JP | 2008-243018 A | | 10/2008 |
| JP | 2011248540 A | * | 12/2011 |
| JP | 2013-95047 A | | 5/2013 |
| JP | 2013-95048 A | | 5/2013 |
| JP | 2017-94642 A | | 6/2017 |

OTHER PUBLICATIONS

PCT/IB/326 from PCT/JP2020/029785 dated Mar. 3, 2022.
PCT/IB/373 from PCT/JP2020/029785 dated Feb. 17, 2022.
PCT/ISA/237 from PCT/JP2020/029785 dated Oct. 20, 2020.

* cited by examiner

NON-TRANSITORY COMPUTER-READABLE STORAGE MEDIUM

CROSS-REFERENCE TO RELATED APPLICATIONS

This is a continuation application of International Application No. PCT/JP2020/029785 filed on Aug. 4, 2020 which claims priority from Japanese Patent Application No. 2019-150806 filed on Aug. 21, 2019. The entire contents of the earlier applications are incorporated herein by reference.

TECHNICAL FIELD

The disclosure relates to a non-transitory computer-readable storage medium storing a program for causing a device to display information of a consumable item.

BACKGROUND ART

There is known a technique for acquiring information of a consumable item to be used in a printer and managing printing using the consumable item. For example, related art discloses a configuration in which code information printed on a label is read and printing on the label is managed.

It may take time and effort to select a consumable item suitable for a user from a plurality of consumable items. For example, when a purchased consumable item is to be selected or a consumable item used in the past is to be selected, it is troublesome to find a corresponding consumable item from a plurality of types of consumable items. In Patent Literature 1, information of a label to be used is read to manage the label, but operability when selecting a label in a device is not disclosed.

SUMMARY

An aspect of the disclosure discloses a technique for improving operability when a consumable item to be used in a printer is selected by a device.

According to an aspect of the disclosure, there is provided a non-transitory computer-readable storage medium storing a program executable by a computer of a device having a function of reading a code image, the program, when executed by the computer, causing the device to perform: causing a reader of the device to read the code image; determining, based on code information indicated by the read code image and identification information of a consumable item of a printer stored in a first memory, whether to register the identification information of the consumable item indicated by the code information; registering the identification information of the consumable item indicated by the code information in a second memory in a case where the determining determines to register the identification information; and displaying, on a display of the device, unique information of a consumable item whose identification information is registered in the second memory in a display mode different from a display mode of unique information of a consumable item whose identification information is not registered in the second memory.

By executing the program, the device determines, based on the code information indicated by the code image read by the reader and the information stored in the first memory, whether to register the identification information of the consumable item, and registers the identification information of the consumable item in the second memory in a case where the determining determines to register the identification information of the consumable item. Then, information of a consumable item whose identification information is registered in the second memory is displayed in a display mode different from a display mode of a consumable item whose identification information is not registered in the second memory. Since a consumable item whose identification information is registered is likely to be a consumable item owned by the user, by changing the display modes, when the user selects a consumable item, for example, a valid consumable item that the user has owned can be distinguished from a consumable item that the user has not owned and an invalid consumable item that the user has owned but was not able to be registered. Accordingly, the selection of a consumable item becomes easy.

An information processing device that implement the functions of the program and a control method for implementing the functions of the program are also novel and useful.

According to the above-described aspect, a technique for improving operability when a consumable item to be used in a printer is selected by a device is realized.

DETAILED DESCRIPTION

Hereinafter, an embodiment in which a program incorporated in a device is embodied will be described in detail with reference to the accompanying drawings. The present embodiment discloses an application program (hereinafter, referred to as "application") incorporated in a portable device capable of displaying an image, such as a smartphone.

Figure 1:
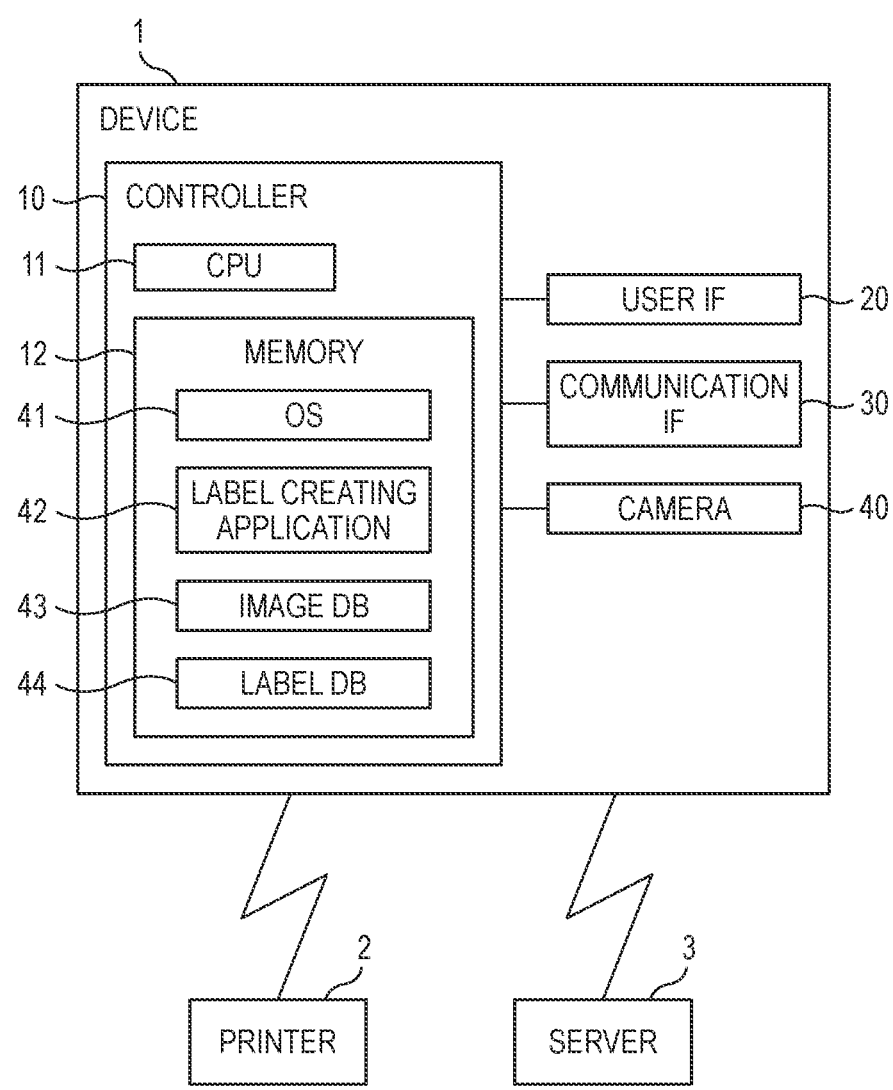
FIG. 1 is a schematic configuration diagram of a device according to an embodiment.

As shown in FIG. 1, a device 1 according to the present embodiment includes a controller 10 including a CPU 11 and a memory 12, and is connectable to a printer 2. The device 1 further includes a user interface (hereinafter referred to as "user IF") 20, a communication interface (hereinafter referred to as "communication IF") 30, and a camera 40, which are electrically connected to the controller 10. The device 1 is, for example, a device capable of executing various applications for causing the printer 2 to perform printing. The controller 10 in FIG. 1 is a collective term of hardware and software used to control the device 1, and does not necessarily represent a single piece of hardware that actually exists in the device 1.

The CPU 11 executes various processing in accordance with a program read from the memory 12 and based on an operation of a user. The CPU 11 is an example of a computer. The memory 12 includes a ROM, a RAM, and a nonvolatile memory such as an HDD and a flash memory, and stores various programs and data.

The user IF 20 includes a touch panel having both a display function and an operation receiving function. The user IF 20 is an example of a display and an example of an input interface. The user IF 20 may include a combination of a display or the like that displays information and a keyboard, a mouse, or the like that receives an input operation by the user.

The communication IF 30 includes hardware for communicating with an external device such as the printer 2 and the server 3. A communication manner of the communication IF 30 may be wireless or wired, and may be a manner of any standard such as Wi-Fi (registered trademark), Bluetooth (registered trademark), USB, or LAN. The device 1 according to the present embodiment may have a function of connecting to the Internet via the communication IF 30.

The camera 40 includes hardware having an imaging function. The camera 40 is an example of a reader. The camera 40 may be incorporated in the main body of the device 1, or may be a separate body that can be connected to the device 1.

The printer 2 connected to the device 1 of the present embodiment is, for example, a so-called label printer that includes a thermal transfer type print head, accommodates a label sheet wound in a roll shape, and performs printing while unwinding the label sheet. For example, the printer 2 prints an image on the accommodated label sheet based on a print job received from the device 1, conveys the label sheet, and causes a printed portion to protrude to the outside of the device. The label sheet that can be accommodated in the printer 2 is determined in advance for each model of the printer 2 based on a width of the label sheet and the like. The width of the label sheet is the size in a direction orthogonal to a conveyance direction of the label sheet by the printer 2.

As shown in FIG. 1, the device 1 according to the present embodiment can be connected to the server 3 via the communication IF 30. The server 3 is, for example, a device including a storage area for storing information of a label sheet used in various label printers, and stores information of a label sheet that can be used for each printer model. The storage area of the server 3 is an example of a first memory. The information of a label sheet includes, for example, the size of the label sheet, the color pattern, whether the label sheet is for sale or out of sale, the price of the label sheet when the label sheet is for sale, and whether the label sheet is in stock. The server 3 may be connected via the Internet, and may be, for example, a cloud server.

As shown in FIG. 1, an operating system (hereinafter, referred to as "OS") 41, a label creating application 42, an image database (hereinafter, referred to as "image DB") 43, and a label information database (hereinafter, referred to as "label DB") 44 are incorporated in the memory 12 of the device 1 in the present embodiment. The OS 41 is, for example, any one of iOS (registered trademark), Android (registered trademark), Windows (registered trademark). Mac OS (registered trademark), and Linux (registered trademark).

The label creating application 42 in the present embodiment is an application for creating various labels using the printer 2. The label creating application 42 is an example of a program. The label creating application 42 receives an instruction from the user such as creating, editing, and printing of an image to be printed by the printer 2, and executes display of the image on the user IF 20 and transmission of a print job to the printer 2 based on the received instruction. The label creating application 42 in the present embodiment may be a program that can be executed independently based on an execution instruction from the user, or may be a program that is called from another program and executed during execution of the other program.

The image DB 43 is a storage area for storing various types of image data to be used in the label creating application 42. The image DB 43 stores, for example, a plurality of template images displayed by the label creating application 42 and image data of a plurality of usage example images indicating respective usage examples corresponding to the respective template images. The template image to be used in the label creating application 42 is image data of a prototype for label creation, and includes, for example, a character string, a code image, a frame image, and an illustration sample. The image data stored in the image DB 43 may be stored at all times or may be acquired from the server 3 or the like as necessary.

The label DB 44 is a storage area for storing information of a label sheet that is a consumable item to be used for printing in the printer 2. The label DB 44 is an example of a second memory. The label creating application 42 receives, for example, a register instruction of the information of the label sheet, and stores the information of the label sheet in the label DB 44 based on the received instruction.

Next, a procedure of label creation processing by the label creating application 42 according to the present embodiment will be described with reference to a flowchart of FIGS. 2A and 2B. The label creation processing is executed by the CPU 11 of the device 1 when an execution instruction of the label creating application 42 is received. Each processing step of the following processing and flowcharts basically indicates processing of the CPU 11 according to an instruction described in each program. The processing by the CPU 11 also includes hardware control using the API of the OS 41 of the device 1. In the present description, the operation of each program will be described while omitting the description of the OS 41.

In the label creation processing, the CPU 11 first displays a top screen on the user IF 20 (S101). The top screen of the label creation processing according to the present embodiment includes, for example, options for selecting one template image from a plurality of template images, and the CPU 11 accepts the selection of the template image on the top screen. Then, the CPU 11 determines whether the selection of the template image is received (S102).

In a case where it is determined that the selection of the template image is not received (S102: NO), the CPU 11 determines whether a register instruction of information of a label sheet is received (S103). The register instruction of the information of a label sheet is received by, for example, an operation on a registration button included in the top screen. In a case where it is determined that the register instruction is not received (S103: NO), the CPU 11 determines whether an end instruction of the label creating application 42 is received (S104). In a case where it is determined that the end instruction is not received (S104: NO), the CPU 11 returns to S102 and waits until any one of a selection instruction, the register instruction, and the end instruction is received. In a case where it is determined that the end instruction is received (S104: YES), the CPU 11 ends the label creation processing.

Figure 3:
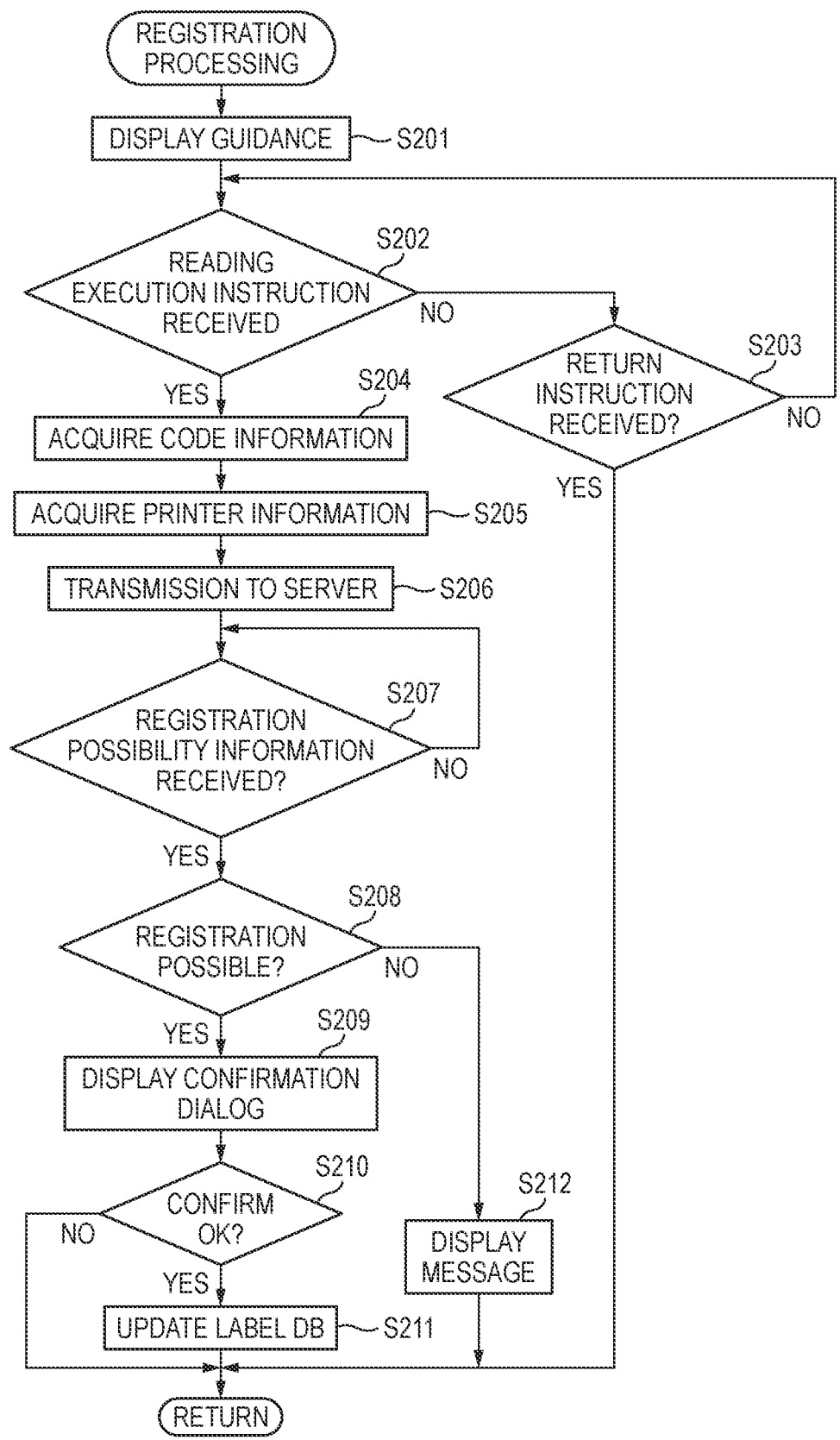
FIG. 3 is a flowchart showing a procedure of registration processing.

In a case where it is determined that the register instruction is received (S103: YES), the CPU 11 executes registration processing (S105). A procedure of the registration processing will be described with reference to the flowchart of FIG. 3.

In the registration processing, the CPU 11 first displays guidance for registering label information on the user IF 20 (S201). The guidance includes, for example, a message prompting the camera 40 of the device 1 to read a code image such as a bar code or a QR code (registered trademark) attached to the label sheet, and a button for receiving an instruction to execute reading of the code image. Then, the CPU 11 determines whether a code image reading execution instruction is received (S202). The code image may be directly attached to the label sheet, or may be attached to a package, a warranty certificate, or the like of the label sheet.

In case where it is determined that the reading execution instruction is not received (S202: NO), the CPU 11 determines whether a return instruction is received (S203). The return instruction is an instruction to stop the registration processing and return to the label creation processing. In a case where it is determined that the return instruction is not received either (S203: NO), the CPU 11 returns to S202 and waits until either the reading execution instruction or the return instruction is received.

In a case where it is determined that the reading execution instruction received (S202: YES), the CPU 11 activates the camera 40 and receives an image capturing instruction. When the image capturing instruction is received and a captured image is acquired, the CPU 11 extracts a code image from the captured image and acquires code information based on the extracted code image (S204). S204 is an example of "causing a reader of the device to read the code image." The label creating application 42 in the present embodiment may include software for extracting a code image such as a two-dimensional code included in the captured image based on the captured image acquired by the camera 40 and acquiring the code information from the extracted code image, or may cause the OS 41 to execute the extraction of the code image and the acquisition of the code information and then acquire the code information from the OS 41.

The code information of the code image attached to the label sheet includes at least identification information of the label sheet, and includes information of, for example, a product number, a manufacturing place, and a manufacturing time of the label sheet. The code information may further include URL of the server 3. In S204, the CPU 11 may receive an instruction to check the captured image or to re-capture an image.

Further, the CPU 11 acquires printer information, which is information of the printer 2 connected to the device 1, as a device for printing using the label sheet (S205). S205 is an example of "receiving designation of a printer via an input interface of the device." For example, the CPU 11 causes the user IF 20 to display information of printers connected to the device 1 and receives designation of a printer. The CPU 11 acquires, for example, model information of the printer 2, information of an attached option, and version information of the firmware as the information of the designated printer 2. The CPU 11 may acquire the printer information by a user input, may acquire the printer information from information stored in the label creating application 42, may acquire the printer information from the OS 41, or may acquire the printer information by communicating with the printer 2.

The CPU 11 transmits the code information acquired in S204, the printer information acquired in S205, and information for inquiring about the possibility of registration to the server 3 (S206). The URL of the server 3 as the transmission destination may be included in the code information or may be stored in the label creating application 42.

When the server 3 receives the information for inquiring about the possibility of registration, the server 3 returns registration possibility information, which is information indicating whether the label sheet indicated by the code information is a label sheet that can be handled by the printer indicated by the printer information and is included in a valid label sheet group, based on the information stored in the server 3. The valid label sheet is, for example, a label sheet for sale, and an invalid label sheet is, for example, a label sheet out of sale or out of stock.

The CPU 11 determines whether the registration possibility information is received (S207), and in a case where it is determined that the registration possibility information is not received (S207: NO), the CPU 11 waits until the registration possibility information is received. The registration possibility information is an example of registration information, and S207 is an example of "transmitting the code information indicated by the read code image to a server connected to the device via a communication interface of the device and receiving registration information indicating whether registration of the consumable item indicated by the transmitted code information is possible from the server." In a case where it is determined that the registration possibility information is received (S207: YES), the CPU 11 determines whether information indicating that registration is possible is received (S208). S208 is an example of "determining, based on code information indicated by the read code image and identification information of a consumable item of a printer stored in a first memory, whether to register the identification information of the consumable item indicated by the code information."

In a case where it is determined that the information indicating that the registration is possible is received (S208: YES), the CPU 11 causes the user IF 20 to display a confirmation dialog for confirming whether to register the information of the label sheet (S209). For example, the CPU 11 causes the user IF 20 to display the information of the label sheet based on the acquired code information, and receives an instruction to confirm whether the acquired information is appropriate. Then, the CPU 11 determines whether an input of OK is received in the confirmation dialog (S210).

In a case where it is determined that the input of OK is received (S210: YES), the CPU 11 updates the label DB 44 by storing the information of the label sheet in the label DB 44 (S211). S211 is an example of "registering the identification information of the consumable item indicated by the code information in a second memory in a case where the determining determines to register the identification information." The information of the label sheet stored in the label DB 44 is identification information for distinguishing the types of individual label sheets, and may be the code information acquired in S204, information such as a product number indicating the label sheet, or a combination of information indicating the name, the color pattern, the size, or the like of the label sheet. The label information registered in the label DB 44 is information of a label sheet from which the code image is read by the user and which is estimated to be owned by the user.

In a case where it is determined that the information indicating that registration is possible is not received from the server 3 (S208: NO), the CPU 11 causes the user IF 20 to display a message indicating that registration is not possible (S212). S212 is an example of "displaying information indicating that the identification information is not registered in the second memory on the display in a case where the determining determines not to register the identification information." When the information received from the server 3 is added with the information indicating that the registration is not possible and the information indicating a reason why the registration is not possible, the CPU 11 also displays the reason in the message. When the CPU 11 does not receive information from the server 3 even after a predetermined time has elapsed, the CPU 11 ends the standby in S207 and determines NO in S208. In this case, the CPU 11 displays a message indicating timeout. By notifying that the registration is not possible, the user can grasp that the registration is not possible. In the present embodiment, the CPU 11 also stores the information of a label sheet that cannot be registered despite the reception of the register instruction from the user in the label DB 44, together with the information indicating that the registration is not possible.

In a case where it is determined that the return instruction is received (S203: YES), or in a case where it is determined that an input of not OK is received (S210: NO), or after S211 or S212, the CPU 11 ends the registration processing and returns to the label creation processing.

Figure 2A:
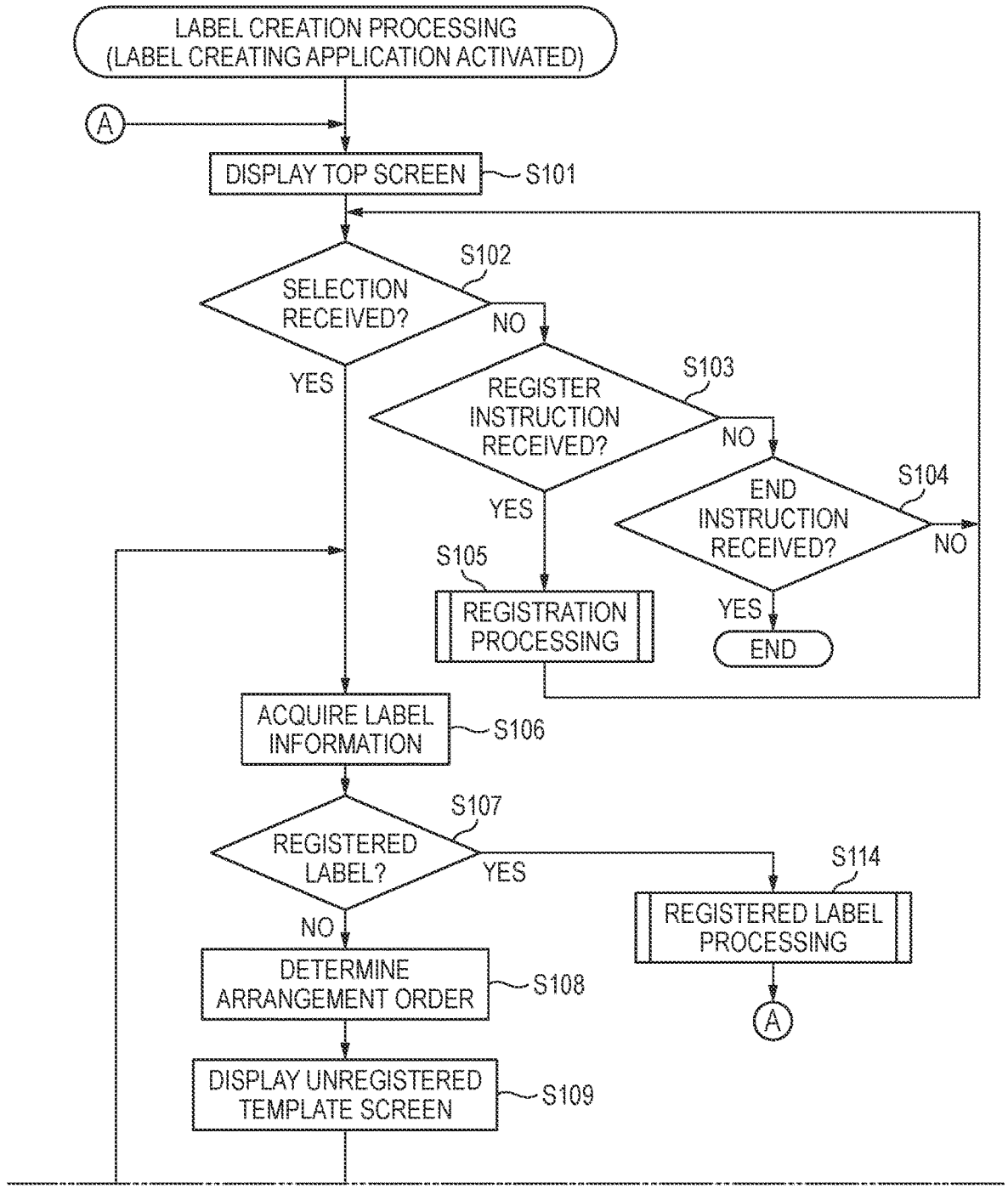
FIGS. 2A and 2B are a flowchart showing a procedure of label creation processing.
Figure 2B:
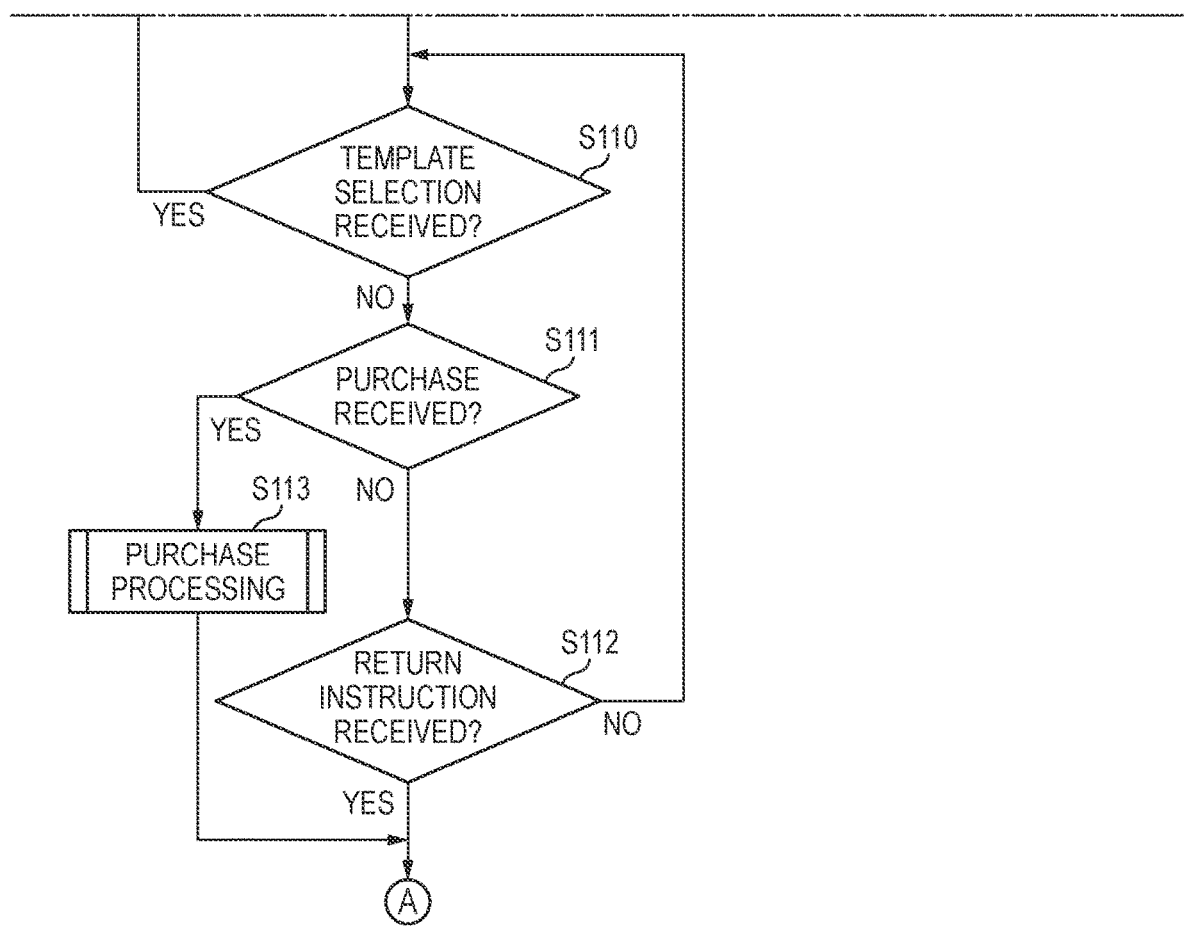

The description returns to the label creation processing of FIGS. 2A and 2B. After the registration processing of S105, the CPU 11 returns to S102 and waits until any one of the selection instruction, the register instruction, and the end instruction is received.

In a case where it is determined that the selection instruction of a template image is received (S102: YES), the CPU 11 acquires information of a label sheet recommended for the selected template image (S106). Each template image is recommended to use a label sheet corresponding to each use image, and information of the recommended label sheet is added to each template image. The number of recommended label sheets may be one or more.

The CPU 11 determines whether a label sheet registered in the label DB 44 is included in the recommended label sheet (S107). In a case where it is determined that the registered label sheet is not included (S107: NO), the CPU 11 determines an arrangement order of other template images (S108), and displays the unregistered template screen on the user IF 20 (S109). S109 is an example of "displaying a plurality of template images on the display."

Figure 4:
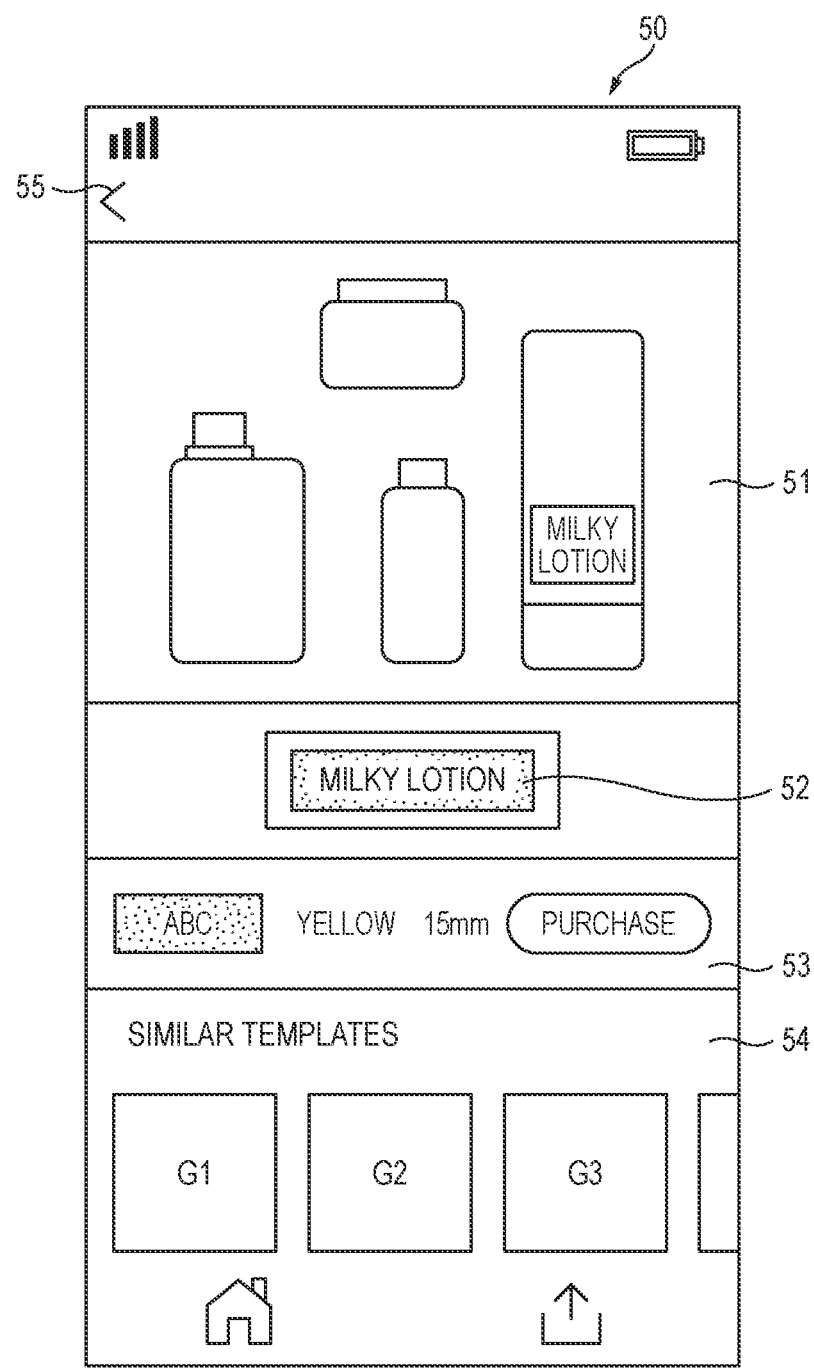
FIG. 4 is an explanatory diagram showing an example of an unregistered template screen.

As shown in FIG. 4, for example, the unregistered template screen 50 includes a usage example image 51 of the selected template image, a template image 52, recommended label sheet information 53, a selection area 54 for receiving selection of other template images, and a return button 55. The usage example image 51 is an image showing a usage example of the selected template image, and for example, the usage example image 51 is displayed as an option of the template image on the top screen. The template image 52 is a currently selected template image. In the recommended label sheet information 53, information of a label sheet recommended for printing the currently selected template image 52 is displayed. In the example of FIG. 4, the recommended label sheet in the currently selected template image 52 is an unregistered label sheet, and a purchase button is also displayed in the recommended label sheet information 53.

In the selection area 54, usage example images G1 to G3 of template images other than the currently selected template image are displayed as options. Each of the usage example images G1, G2, and the like displayed in the selection area 54 is an object for receiving selection of a template image. The return button 55 is a button for receiving an instruction to close the unregistered template screen 50 and return to the top screen.

In S108, the CPU 11 determines the arrangement order of the usage example images G1 and G2 and the like to be displayed in the selection area 54. Specifically, the CPU 11 determines the arrangement order such that usage example images of the template images for which the label sheets registered in the label DB 44 are recommended, which are usage example images of template images similar to the currently selected template image, are displayed in first order. In the selection area 54, the usage example images G1 and G2 and the like of other template images similar to the currently selected template image are first displayed. In the image DB 43, usage example images of template images similar to each other are grouped and stored. Alternatively, information indicating another similar usage example image may be added to each usage example image.

The label sheet recommended for the currently selected template image is a label sheet not registered in the label DB 44, and it is estimated that the label sheet is not owned by the user. The label creating application 42 in the present embodiment preferentially displays a template image for which the label sheet registered in the label DB 44 is recommended as an option of another template image to be displayed in the selection area 54, so that a template image that is likely to be used immediately is easily selected.

In a case where all of a plurality of usage example images to be displayed cannot be displayed in the selection area 54, the CPU 11 performs scroll display. For example, in the example shown in FIG. 4, the usage example images in the selection area 54 are displayed in a row so as to be horizontally scrollable in a horizontal direction in the drawing. In this case, since the usage example image to be preferentially displayed is displayed without scrolling, it is easy to select the usage example image. A method of displaying the usage example image of the template image for which the registered label sheet is recommended with a higher priority is not limited to the example in which the order of arrangement is set first, and for example, the usage example image may be displayed in a thick frame, may be displayed in a large size, or may be displayed in the center.

The CPU 11 determines whether the selection of another template image is received from the options being displayed in the selection area 54 on the unregistered template screen 50 being displayed (S110). S110 is an example of "receiving a selection of one template image from the plurality of template images being displayed via an input interface of the device."

In a case where it is determined that selection of a template image is not received (S110: NO), the CPU 11 determines whether an operation on the purchase button in the recommended label sheet information 53 is received (S11). In a case where it is determined that the operation on the purchase button is not received (S111: NO), the CPU 11 determines whether an operation on the return button 55 is received (S112). In a case where it is determined that the operation on the return button 55 is not received (S112: NO), the CPU 11 waits until any one of the selection of the template image, the operation on the purchase button, or the operation on the return button 55 is received.

In a case where it is determined that the operation on the purchase button is received (S111: YES), the CPU 11 executes a purchase processing (S113). The purchase processing is a process of displaying a list of purchasable label sheets and receiving a purchase instruction from the user. The start of the purchase processing due to the reception of the operation on the purchase button is an example of a condition for displaying a list of label sheets, and is an example satisfying the display condition.

Figure 5:
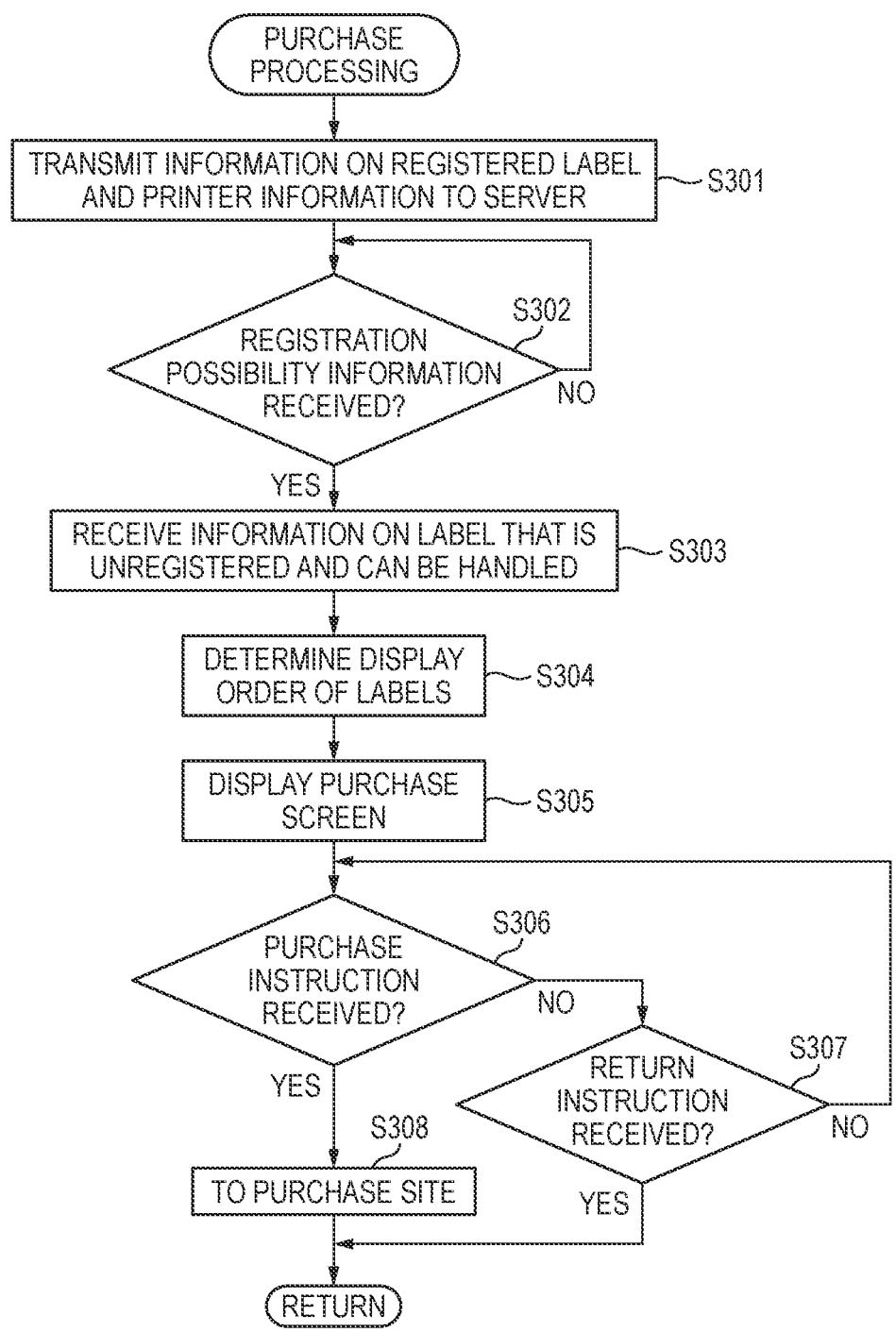
FIG. 5 is a flowchart showing a procedure of purchase processing.

A procedure of the purchase processing will be described with reference to the flowchart of FIG. 5. In the purchase processing, the CPU 11 transmits the information of the label sheet registered in the label DB 44 and the printer information to the server 3 (S301). The printer information may be acquired in the same manner as in S205. Then, the CPU 11 determines whether the registration possibility information is received from the server 3 (S302). The registration possibility information is the same information as the information received in S207 of the registration processing. S302 is an example of "transmitting the identification information of the consumable item registered in the second memory to the server and receiving the registration information indicating whether registration of the consumable item indicated by the transmitted identification information is possible from the server when a display condition for displaying unique information of a consumable item whose identification information is registered in the second memory is satisfied." In a case where it is determined that the registration possibility information is not received (S302: NO), the CPU 11 waits until the registration possibility information is received. When there are a plurality of registered label sheets, the CPU 11 receives the registration possibility information for all the label sheets.

When the CPU 11 determines that the registration possibility information is received (S302: YES), the CPU 11 receives, from the server 3, information of a label sheet that is the unregistered label sheet in the label DB 44 and can be handled by the printer 2, where the information is determined based on the printer information transmitted in S301 (S303). Further, the CPU 11 determines a display order of the label sheets to be displayed on the purchase screen (S304), and causes the user IF 20 to display the purchase screen (S305). S305 is an example of "displaying, on a display of the device, unique information of a consumable item whose identification information is registered in the second memory in a display mode different from a display mode of unique information of a consumable item whose identification information is not registered in the second memory."

Figure 6:
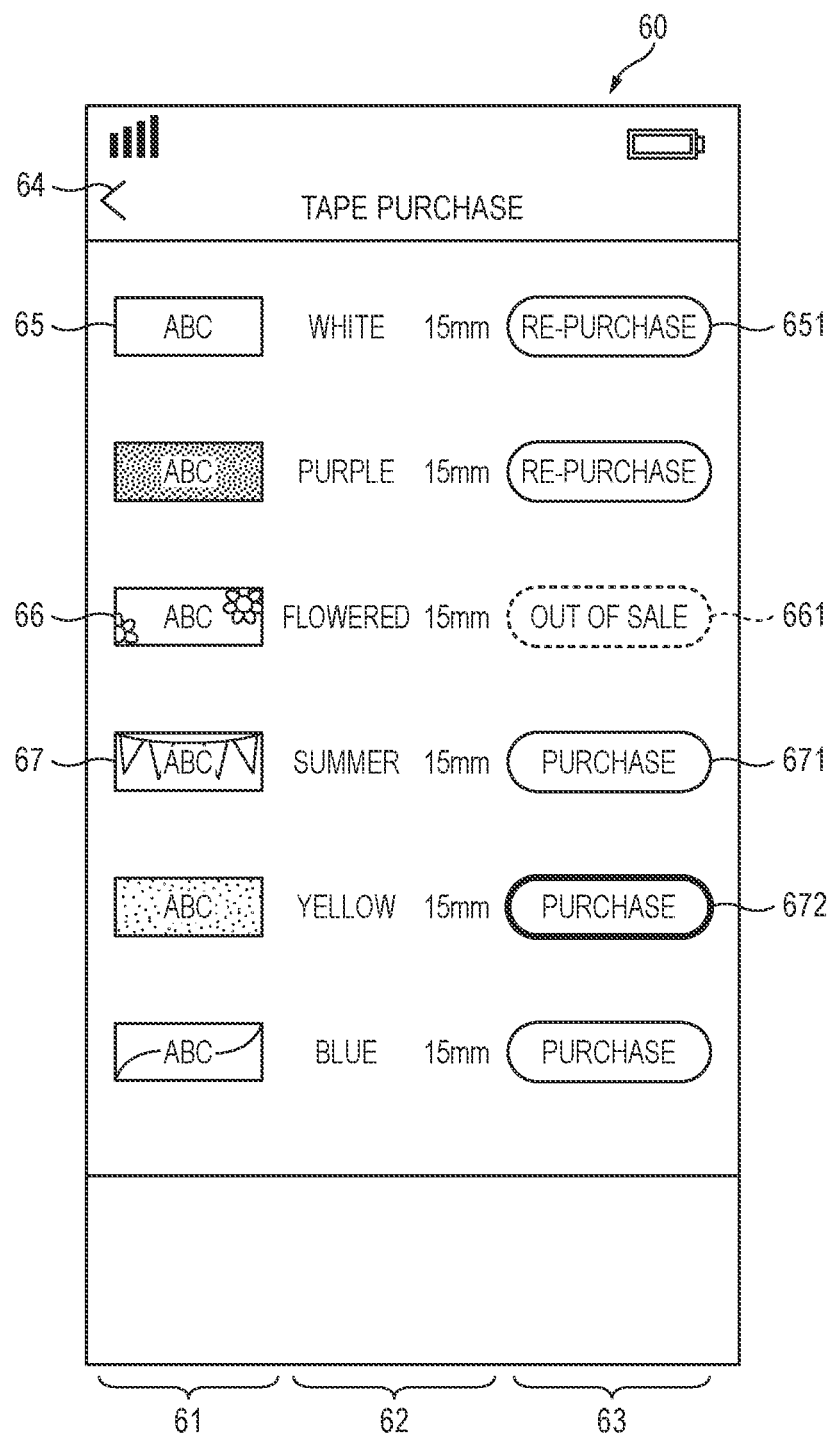
FIG. 6 is an explanatory diagram showing an example of a purchase screen.

For example, as shown in FIG. 6, the purchase screen 60 is a screen for displaying information of various types of label sheets that can be handled by the printer 2, and includes an image diagram 61, label sheet information 62, an instruction button 63, and a return button 64. The image diagram 61 is an image showing a print image of each label sheet. The label sheet information 62 is information such as the name and size of each label sheet. The instruction button 63 is a button for receiving a purchase instruction from the user. The return button 64 is a button for receiving an instruction to close the purchase screen 60 and return to the previous display.

In the purchase screen 60, a set of the image diagram 61, the label sheet information 62, and the instruction button 63 of each label sheet is unique information of the label sheet, and is displayed differently for each label sheet. The CPU 11 displays a registered label sheet that can be purchased, that is, the label sheet is for sale, in a display mode with the highest priority. For example, in the purchase screen 60 shown in FIG. 6, a label sheet 65 with the highest priority is preferentially displayed in the upper part of the screen. The instruction button 63 associated with the label sheet 65 with the highest priority is a re-purchase button 651 for receiving an instruction to re-purchase. The re-purchase button 651 is an example of a first image.

Further, the CPU 11 sets a registered label sheet that cannot be purchased, that is, the label sheet is out of sale, in the next order. For example, in the purchase screen 60 shown in FIG. 6, a label sheet 66 in the next order is displayed below all of the label sheets 65 with the highest priority, and the instruction button 63 associated with the label sheet 66 is an out of sale button 661 that does not accept the purchase instruction.

Further, the CPU 11 sets a label sheet that is the unregistered label sheet and can be handled by the printer 2 in the last order. For example, in the purchase screen 60 shown in FIG. 6, a label sheet 67 in the last order is displayed below the label sheet 66 in the next order, and the instruction button 63 associated with the label sheet 67 is a purchase button 671 for receiving a purchase instruction. A display mode of the purchase button 671 is different from at least a display mode of the re-purchase button 651. The purchase button 671 is an example of a second image. The purchase screen 60 shown in FIG. 6 shows an example in which a highlighted purchase button 672 is displayed as the instruction button 63 associated with the label sheet for which the purchase instruction is received in S111 of the label creation processing.

On the purchase screen 60, a registered and valid label sheet and an unregistered label sheet or an invalid label sheet are displayed in different modes. In particular, since the registered label sheet for sale is preferentially displayed, the display is easy to understand for the user who wants to purchase the same label sheet again. The display mode with high priority is not limited to the upward display, and may be, for example, highlighted display by changing the size, color, font, or the like of the instruction button 63. The unregistered label sheet is displayed in a display mode different from that of the registered label sheet, and for example, the instruction buttons 63 are displayed in different display modes, so that the user can clearly distinguish between the unregistered label sheet and the registered label sheet and give a purchase instruction.

Even if the label sheet is a registered label sheet, the situation may change. For example, the label sheet may become out of sale. Therefore, in the present embodiment, when the purchase screen 60 is displayed, the server 3 is inquired again before the purchase instruction is received, and the display mode is changed based on the received registration possibility information. For example, since the display mode of the label sheet out of sale is displayed in distinction from the display mode of other label sheets, the selection of the label sheet becomes easier. When the information of the label sheet that cannot be registered despite the reception of the register instruction by the user is stored in the label DB 44 together with the information indicating that the label sheet cannot be registered, the CPU 11 also displays the label sheet as the label sheet 66 in the next order, and does not receive the purchase instruction.

Then, the CPU 11 determines whether a purchase instruction is received on the purchase screen 60 being displayed (S306). The purchase instruction is received by operating the re-purchase button 651 or the purchase buttons 671 and 672. In a case where it is determined that the purchase instruction is not received (S306: NO), the CPU 11 determines whether the return instruction by the operation on the return button 64 is received (S307). In a case where it is determined that the return instruction is not received (S307: NO), the CPU 11 waits until the purchase instruction or the return instruction is received.

In a case where it is determined that the purchase instruction is received (S306: YES), the CPU 11 proceeds to a purchase site for receiving a purchasing procedure (S308). The re-purchase button 651, the purchase buttons 671 and 672, and the like of the purchase screen 60 are assigned with addresses corresponding to the products of the purchase site, respectively, and the CPU 11 starts the browser in response to the reception of the purchase instruction and accesses the assigned addresses.

After S308 or in a case where it is determined that the return instruction is received (S307: YES), the CPU 11 closes the purchase screen 60, ends the purchase processing, and returns to the label creation processing of FIGS. 2A and 2B.

The description returns to the label creation processing of FIGS. 2A and 2B. After the purchase processing in S113 or in a case where it is determined that an operation on the return button 55 on the unregistered template screen 50 (FIG. 4) is received (S112: YES), the CPU 11 closes the unregistered template screen 50 being displayed, returns to S101, and displays the top screen.

On the other hand, in a case where it is determined that the selection of the template image by the operation on any one of the options displayed in the selection area 54 on the unregistered template screen 50 is received (S110: YES), the CPU 11 returns to S106 and acquires the information of the label sheet corresponding to the selected template image. If the information of the label sheet corresponding to the newly selected template image is also the unregistered label sheet, the unregistered template screen 50 is displayed, and the same processing as the procedure described above is performed.

In a case where it is determined that the information of the label sheet corresponding to the selected template image includes a registered label sheet (S107: YES), the CPU 11 executes a registered label processing (S114). The registered label processing is performed when selection of a template image corresponding to a label sheet registered in the label DB 44 is received.

Figure 7A:
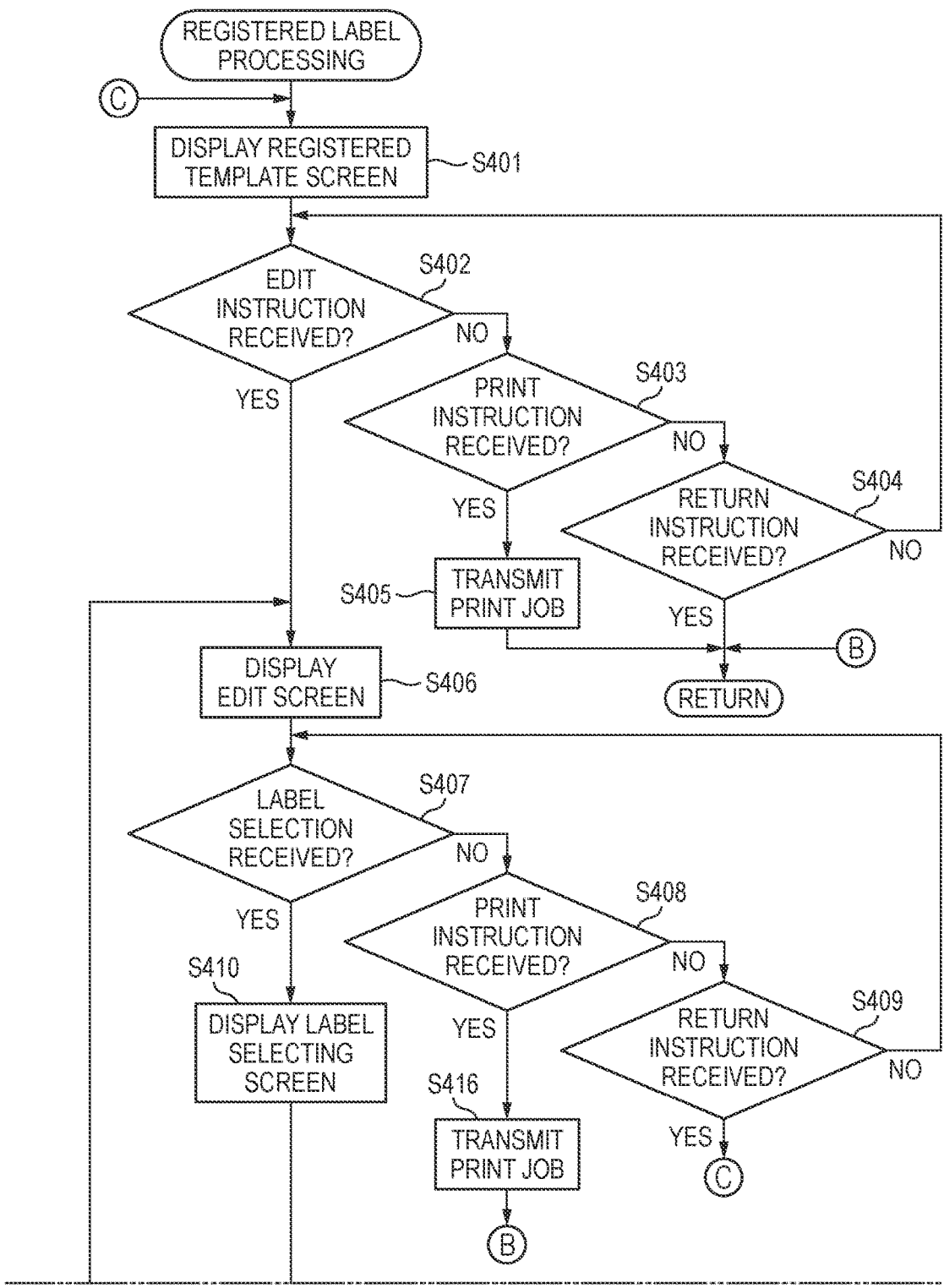
FIGS. 7A and 7B are a flowchart showing a procedure of registered label processing.
Figure 7B:
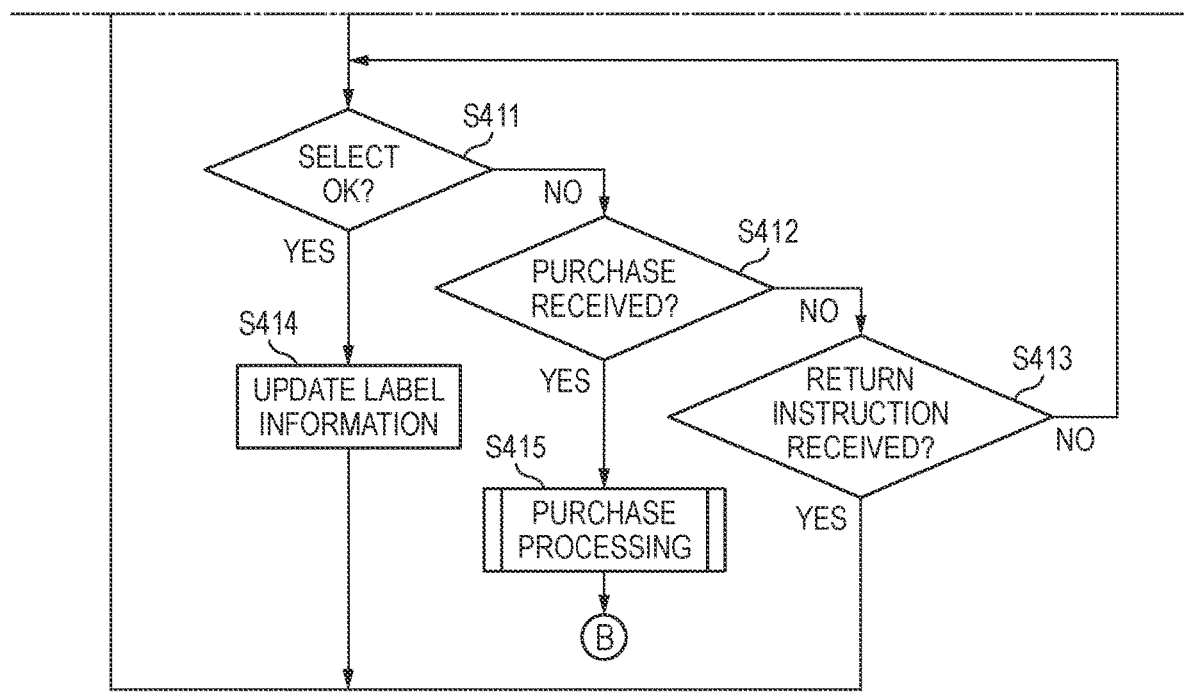

A procedure of the registered label processing will be described with reference to the flowchart of FIGS. 7A and 7B. In the registered label processing, the CPU 11 displays a registered template screen on the user IF 20 (S401). S401 is an example of "displaying, on a display of the device, unique information of a consumable item whose identification information is registered in the second memory in a display mode different from a display mode of unique information of a consumable item whose identification information is not registered in the second memory."

Figure 8:
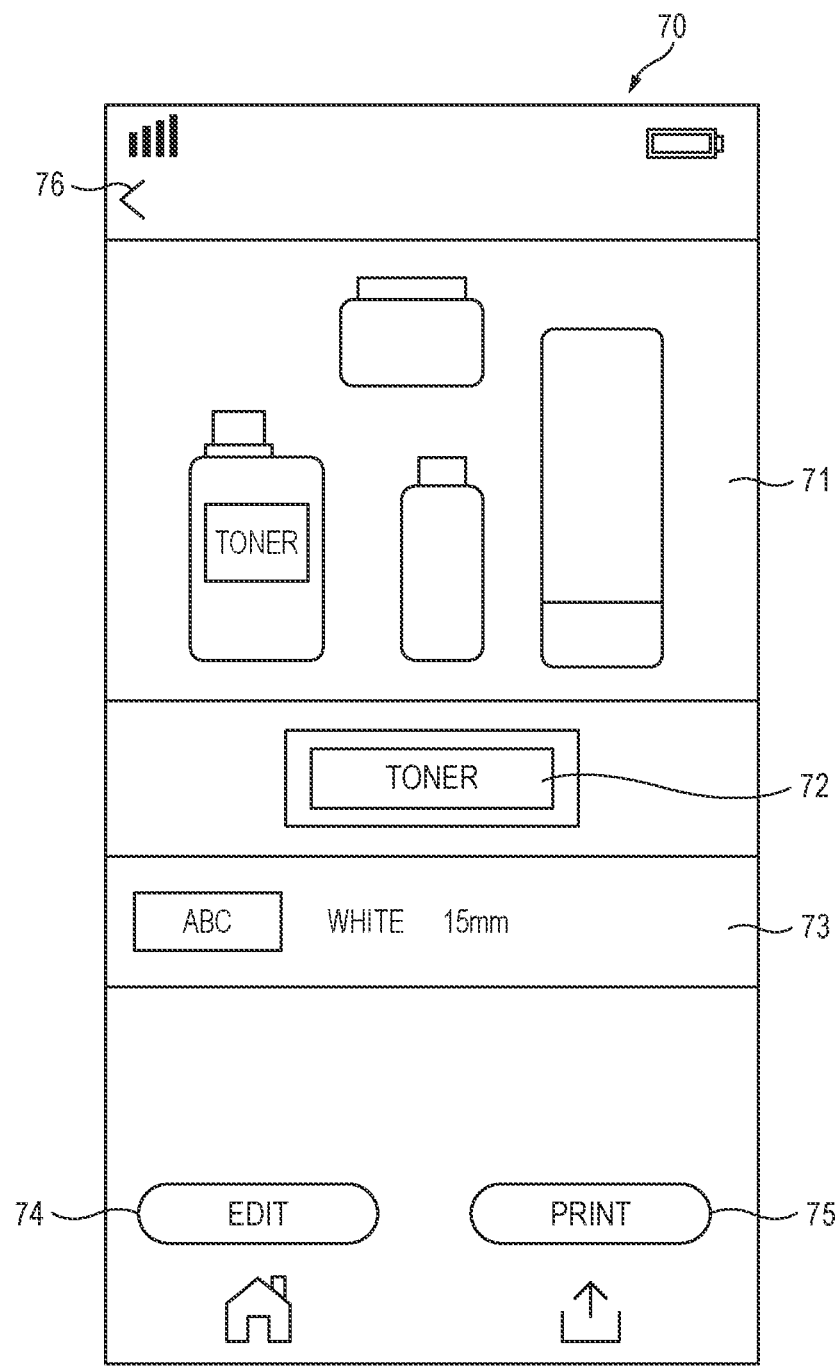
FIG. 8 is an explanatory diagram showing an example of a registered template screen.

As shown in FIG. 8, the registered template screen 70 includes, for example, a usage example image 71 of the selected template image, a template image 72, label sheet information 73 used in the usage example image 71, an edit button 74, a print button 75, and a return button 76. The usage example image 71 and the template image 72 are the selected template image and the usage example image thereof, similarly to the unregistered template screen 50 shown in FIG. 4. Since the label sheet information 73 of the registered template screen 70 is a registered label sheet, unlike in the unregistered template screen 50, the purchase button is not displayed. A re-purchase button may be displayed in the label sheet information 73.

The edit button 74 is a button for receiving an edit instruction to the template image 72. The print button 75 is a button for receiving a print instruction of the template image 72. Since the label sheet information 73 is estimated to be a registered label sheet and a label sheet owned by the user, the CPU 11 displays the print button 75 for receiving the print instruction of the template image 72. The return button 76 is a button for receiving an instruction to close the registered template screen 70 and return to the top screen.

Then, the CPU 11 determines whether an edit instruction by an operation on the edit button 74 is received (S402). In a case where it is determined that the edit instruction is not received (S402: NO), the CPU 11 determines whether the print instruction by the operation on the print button 75 is received (S403). In a case where it is determined that the print instruction is not received (S403: NO), the CPU 11 determines whether the return instruction by the operation on the return button 76 is received (S404). In a case where it is determined that the return instruction is not received (S404: NO), the CPU 11 returns to S402 and waits until any one of the edit instruction, the print instruction, and the return instruction is received.

In a case where it is determined that the print instruction is received (S403: YES), the CPU 11 generates a print job with the currently displayed template image 72 as a print target, and transmits the print job to the printer 2 (S405). On the other hand, in a case where it is determined that the edit instruction is received (S402: YES), the CPU 11 causes the user IF 20 to display an edit screen (S406). The edit screen is a screen for accepting editing of the template image 72.

Figure 9:
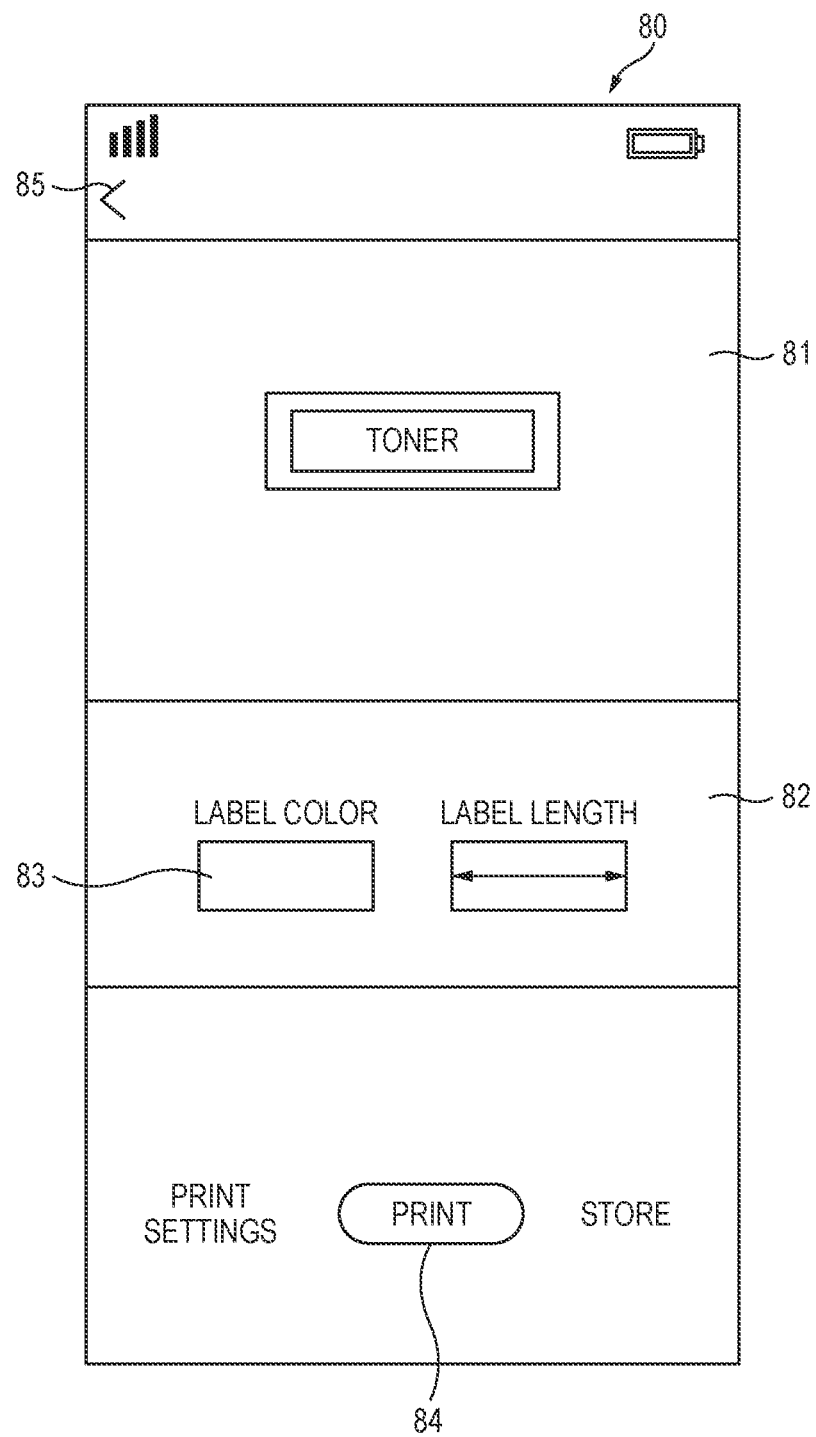
FIG. 9 is an explanatory diagram showing an example of an edit screen.

As shown in FIG. 9, for example, the edit screen 80 includes an edit area 81 for a template image, label sheet information 82, a print button 84, and a return button 85, and includes a label sheet selection button 83 in the label sheet information 82. The edit area 81 is an area in which a template image to be edited is displayed and which receives editing to the template image. In the label sheet information 82, information of the label sheet and print settings stored in association with the template image being edited are displayed. The label sheet selection button 83 of the label sheet information 82 is a button for receiving a label sheet change instruction. The print button 84 is a button for receiving a print instruction of the currently displayed template image in the edit area 81. The return button 85 is a button for receiving an instruction to stop editing operation on the template image, close the edit screen 80 being displayed, and return to the registered template screen 70.

Then, the CPU 11 determines whether the label sheet change instruction by the operation on the label sheet selection button 83 is received (S407). In a case where it is determined that the label sheet change instruction is not received (S407: NO), the CPU 11 determines whether the print instruction by the operation on the print button 84 is received (S408). In a case where it is determined that the print instruction is not received (S408: NO), the CPU 11 determines whether the return instruction by the operation on the return button 85 is received (S409). In a case where it is determined that the return instruction is not received (S409: NO), the CPU 11 returns to S406 and waits until any one of the label sheet change instruction, the print instruction, and the return instruction is received.

In a case where it is determined that the return instruction is received (S409: YES), the CPU 11 returns to S401, closes the edit screen 80, and displays the registered template screen 70. On the other hand, in a case where it is determined that the label sheet change instruction is received (S407: YES), the CPU 11 displays a label sheet selecting screen on the user IF 20 (S410). S410 is an example of "displaying, on a display of the device, unique information of a consumable item whose identification information is registered in the second memory in a display mode different from a display mode of unique information of a consumable item whose identification information is not registered in the second memory."

Figure 10:
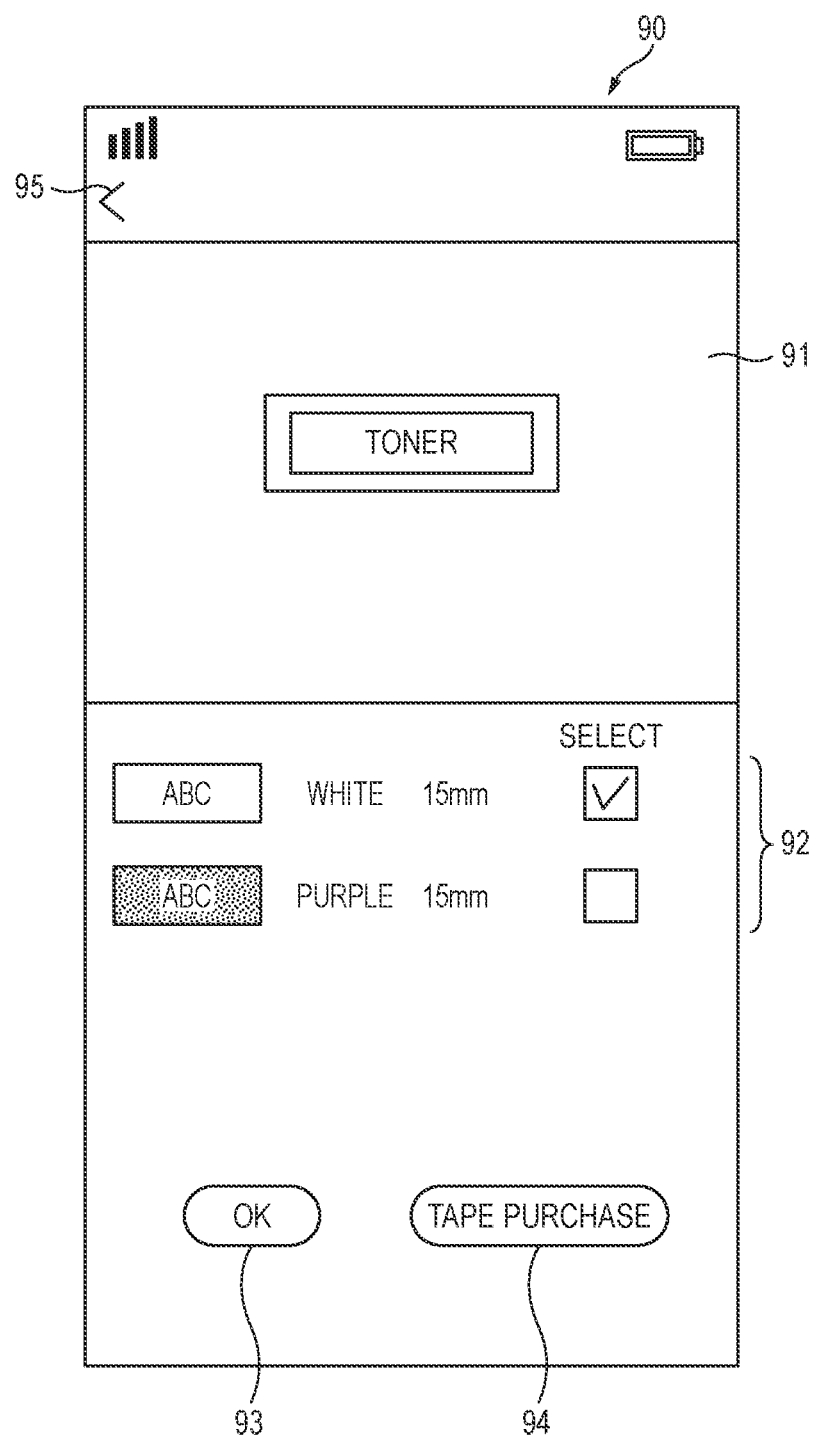
FIG. 10 is an explanatory diagram showing an example of a label sheet selecting screen.

As shown in FIG. 10, the label sheet selecting screen 90 includes, for example, a currently selected template image 91, a label sheet selection field 92, an OK button 93, a tape purchase button 94, and a return button 95. The template image 91 is a currently displayed template image in the edit area 81 of the edit screen 80. In the label sheet selection field 92, a list of label sheets registered in the label DB 44 is displayed, and any one of the label sheets is selected. The OK button 93 is a button for receiving an instruction to confirm the selection in the label sheet selection field 92. The tape purchase button 94 is a button for receiving an instruction to purchase the label sheet. A user who wants to use a label sheet other than the label sheet being displayed in the label sheet selection field 92 operates the tape purchase button 94. The return button 95 is a button for receiving an instruction to close the label sheet selecting screen 90 and return to the edit screen 80.

In the label sheet selection field 92, a registered label sheet and an unregistered label sheet are displayed in different modes. Specifically, information of the label sheet registered in the label DB 44 and corresponding to the template image to be edited is displayed, and information of the unregistered label sheet is not displayed. That is, the label sheet selectable in the label sheet selection field 92 is only the label sheet registered in the label DB 44. The registered label sheet is a label sheet estimated to be owned by the user, and the user can select a label sheet to be used from the label sheets displayed in the label sheet selection field 92, and thus can easily select the label sheet to be used for printing. The label sheet selection field 92 may include a button for receiving re-purchase.

Then, the CPU 11 determines whether an operation on the OK button 93 is received (S411). In a case where it is determined that the operation on the OK button 93 is not received (S411: NO), the CPU 11 determines whether the purchase instruction by the operation on the tape purchase button 94 is received (S412). In a case where it is determined that the purchase instruction is not received (S412: NO), the CPU 11 determines whether the return instruction by the operation on the return button 95 is received (S413). In a case where it is determined that the return instruction is not received (S413: NO), the CPU 11 returns to S411 and waits until any one of the instruction of selecting OK, the purchase instruction, and the return instruction is received.

In a case where it is determined that the operation on the OK button 93 is received (S411: YES), the CPU 11 updates the information of the selected label sheet (S414), and returns to S406 to display the edit screen 80. The label sheet information 82 in the edit screen 80 is information of the updated label sheet. In a case where it is determined that the return instruction is received (S413: YES), the CPU 11 returns to S406 without updating the information. In this case, the edit screen 80 is the same as the previous display. On the other hand, in a case where it is determined that the purchase instruction by the operation on the tape purchase button 94 is received (S412: YES), the CPU 11 executes the purchase processing shown in FIG. 5 (S415).

In a case where it is determined that the print instruction by the operation on the print button 84 of the edit screen 80 being displayed (FIG. 9) is received (S408: YES), the CPU 11 generates a print job with the currently displayed template image in the edit area 81 as a print target, and transmits the print job to the printer 2 (S416). In a case where the label sheet information 82 has been updated, the CPU 11 generates a print job using the updated information. Then, after the print job is transmitted in S405 or S416, after the purchase processing in S415, or in a case where it is determined that the return instruction by the operation on the return button 76 of the registered template screen 70 (FIG. 8) is received (S404: YES), the CPU 11 ends the registered label processing and returns to the label creation processing in FIG. 2.

The description returns to the label creation processing of FIG. 2. In the label creation processing, after the registered label processing in S114, the CPU 11 closes the currently displayed screen, returns to S101, and displays the top screen. This ends the description of the label creation processing.

As described in detail above, in a case where the device 1 according to the present embodiment determines to register the identification information of the label sheet indicated by the code image of the label sheet, the device 1 registers the identification information in the label DB 44, and changes the display mode depending on whether the identification information is registered in the label DB 44 when displaying the information of the label sheet to be used in the printer 2. For example, in the purchase screen 60 shown in FIG. 6 of the present embodiment, a re-purchase button is displayed for a registered and valid label sheet, a purchase button is displayed for an unregistered label sheet, and a button for accepting a purchase is not displayed for an invalid label sheet even if the label sheet is registered. For example, in the label sheet selecting screen 90 shown in FIG. 10, only the registered label sheet is displayed, and the unregistered label sheet is not displayed. Therefore, when the user selects a label sheet, it is possible to distinguish a valid label sheet that is owned by the user from a label sheet that is not owned or a label sheet that is owned but is invalid. Accordingly, the selection of the label sheet becomes easy.

It should be noted that the present embodiment is merely an example, and does not limit the disclosure in any way. Therefore, the disclosure can be improved and modified in various ways without departing from the scope of the disclosure.

For example, the device 1 is not limited to a portable device, and may be a stationary device such as a personal computer. Further, for example, the number of printers connected to the device 1 is not limited to one, and a plurality of printers may be connected to the device 1. A printing method of the printer 2 is not limited to the thermal transfer method, and may be, for example, a thermal method, an inkjet method, or an electro photographic method. The consumable item is not limited to label sheet, and may be a colorant such as ink or toner, cut paper, or roll paper.

In addition, the program for executing the registration processing may be a program different from the label creating application 42, and in this case, the register instruction of the label information is received by, for example, an activation instruction of the program. The label creating application 42 may refer to the label DB 44 updated in the registration processing.

In the embodiment, the first memory is a storage area of the server 3, but the disclosure is not limited thereto. For example, information of a valid label sheet may be provided in the memory 12 of the device 1, and the label creating application 42 may refer to the information to determine whether a label sheet can be registered in the label DB 44. In this case, the device 1 may update the information of a valid label sheet by appropriately communicating with the server 3, for example. If the server 3 includes the first memory, the information can be updated by, for example, a vendor of the label creating application 42, and there is a high possibility that the latest information can be used.

In the embodiment, the image DB 43 and the label DB 44 are provided in the memory 12 of the device 1, but the disclosure is not limited thereto, and the image DB 43 and the label DB 44 may be provided in a storage location accessible from the device 1.

In the embodiment, model information of the printer 2 is transmitted to the server 3 when the registration possibility information is requested, but the model information may not be transmitted. For example, regardless of a model of the printer, the server 3 may be registered as long as the label sheet is for sale. However, more detailed management is possible by determining whether registration is possible based on the printer information.

In the embodiment, the information of a label sheet that cannot be registered despite the reception of the register instruction from the user is stored in the label DB 44 together with the information indicating that the registration is not possible, but the information may not be stored. That is, the label sheet that cannot be registered may be treated in the same manner as the label sheet for which the register instruction is not received.

In the embodiment, when an operation on the purchase button in the unregistered template screen 50 or on the tape purchase button 94 in the label sheet selecting screen 90 is received, the purchase processing is executed and the purchase screen 60 is displayed. However, a purchase site may be displayed without executing the purchase processing.

In the embodiment, the server 3 requests the registration possibility information before the purchase screen 60 is displayed, but the disclosure is not limited thereto. It is sufficient if a registered label sheet and an unregistered label sheet are displayed in different modes, and the information of the registered label sheet out of sale may not be distinguished. In addition, instead of transmitting the information of the registered label sheet and the printer information to the server 3 and receiving the registration possibility information and the information of the unregistered label sheet, only the printer information may be transmitted to the server 3, the information of all the label sheets for sale that can be handled may be received, and the label creating application 42 may display the registered label sheet so as to be distinguished from the unregistered label sheet.

In addition, the arrangement, shape, and the like of each object in each drawing shown in the embodiment are all examples, and each object can be subjected to modification, arrangement change, addition, deletion, and the like.

In any flowchart disclosed in the embodiment, the execution order of a plurality of processes in any of a plurality of steps can be optionally changed or executed in parallel as long as no contradiction occurs in the processing contents.

In addition, the processing disclosed in the embodiment may be executed by hardware such as a single CPU, a plurality of CPUs, an ASIC, or a combination thereof. In addition, the processing disclosed in the embodiment can be implemented in various aspects such as a storage medium in which a program for executing the processing is stored, a method, or the like.

What is claimed is:

1. A non-transitory computer-readable storage medium storing a program executable by a computer of a device having a function of reading a code image, the program, when executed by the computer, causing the device to perform:
   causing a reader of the device to read the code image;
   determining, based on code information indicated by the read code image and identification information of a consumable item of a printer stored in a first memory, whether to register the identification information of the consumable item indicated by the code information;
   registering, in a second memory, the identification information of the consumable item indicated by the code information in a case where the determining determines to register the identification information; and
   displaying, on a display of the device, unique information of a consumable item whose identification information is registered in the second memory in a display mode different from a display mode of unique information of a consumable item whose identification information is not registered in the second memory.

2. The non-transitory computer-readable storage medium according to claim 1,
   wherein the program, when executed by the computer, causes the device to further perform:
   transmitting the code information indicated by the read code image to a server connected to the device via a communication interface of the device and receiving registration information indicating whether registration of the consumable item indicated by the transmitted code information is possible from the server, the server storing identification information of the consumable item in the first memory, and the server transmitting the registration information based on the received code information and the stored identification information to the device in a case where the code information is received from the device, and
   wherein the determining includes determining to register the identification information in a case where the received registration information indicates that registration is possible, and determining not to register the identification information in a case where the received registration information indicates that registration is not possible.

3. The non-transitory computer-readable storage medium according to claim 2,
   wherein the program, when executed by the computer, causes the device to further perform:
   receiving designation of the printer via an input interface of the device, and
   wherein the transmitting of the code information and the receiving of the registered information includes transmitting the code information indicated by the read code image and the model information of the designated printer to the server, the server storing identification information of a consumable item and model information of the printer in association with each other, and the server transmitting the registration information based on the received code information and the model information to the device in a case where the code information and the model information are received from the device.

4. The non-transitory computer-readable storage medium according to claim 2,
   wherein the program, when executed by the computer, causes the device to further perform:
   transmitting the identification information of the consumable item registered in the second memory to the server and receiving the registration information indicating whether registration of the consumable item indicated by the transmitted identification information is possible from the server when a display condition for displaying unique information of a consumable item whose identification information is registered in the second memory is satisfied, and wherein the displaying includes displaying, on the display, unique information of a consumable item in a case where the registration information received when the display condition is satisfied indicates that registration is not possible in a display mode different from a display mode of unique information of a consumable item in a case where the registration information received when the display condition is satisfied indicates that registration is possible.

5. The non-transitory computer-readable storage medium according to claim 1, wherein the program, when executed by the computer, causes the device to further perform:

displaying information indicating that the identification information is not registered in the second memory on the display in a case where the determining determines not to register the identification information.

6. The non-transitory computer-readable storage medium according to claim 1, wherein the displaying includes displaying, on the display, the unique information of the consumable item whose identification information is registered in the second memory in association with a first image, and displaying, on the display, the unique information of the consumable item whose identification information is not registered in the second memory in association with a second image.

7. The non-transitory computer-readable storage medium according to claim 1, wherein the displaying includes displaying, on the display, the unique information of the consumable item whose identification information is registered in the second memory with a higher priority than the unique information of the consumable item whose identification information is not registered in the second memory.

8. The non-transitory computer-readable storage medium according to claim 1, wherein the program, when executed by the computer, causes the device to further perform:

receiving a selection of at least one consumable item from the consumable item whose unique information is displayed, the selection being received via an input interface of the device, and the selection being received during editing of an image to be printed, and wherein the displaying includes, in a case where the selection of the consumable item is being received, displaying the unique information of the consumable item whose identification information is registered in the second memory and not displaying the unique information of the consumable item whose identification information is not registered in the second memory.

9. The non-transitory computer-readable storage medium according to claim 1, wherein the program, when executed by the computer, causes the device to further perform:

displaying a plurality of template images on the display, and receiving a selection of one template image from the plurality of template images being displayed via an input interface of the device, a corresponding template image among the plurality of template images being defined for each consumable item, and wherein the displaying of the plurality of template images includes displaying, on the display, a first template image among the plurality of template images with a higher priority than a second template image among the plurality of template images, the first template image corresponding to the consumable item whose identification information is registered in the second memory, and the second template image corresponding to the consumable item whose identification information is not registered in the second memory.

10. The non-transitory computer-readable storage medium according to claim 1, wherein the registering includes registering, in the second memory, the identification information of the consumable item indicated by the code information as identification information not to be registered in a case where the determining determines to not register the identification information, and wherein the displaying includes displaying, on the display, unique information of the consumable item whose identification information is registered in the second memory as the identification information not to be registered in a display mode different from a display mode of unique information of a consumable item whose identification information is registered in the second memory but not registered as the identification information not to be registered and the display mode of the unique information of the consumable item whose identification information is not registered in the second memory.

\* \* \* \* \*